United States Patent Office 2,900,333
Patented Aug. 18, 1959

2,900,333
MINERAL WHITE OIL TREATMENT

John F. Collins, Elizabeth, and Robert V. Sheehan, Union, N.J., assignors to Esso Research and Engineering Company, a corporation of Delaware No Drawing. Application July 13, 1956
Serial No. 597,589

4 Claims. (Cl. 208—274)

This invention relates to an improvement of washing color-forming impurities from a mineral-acid-treated white oil by using certain organic solvents added to aqueous isopropanol as the washing solvent.

The kind of organic solvents now found advantageous for addition to aqueous propanol to accomplish the objects set forth are characterized by: boiling points close to that of isopropyl alcohol, i.e. 56.5 to 97° C., a solvency in 50% aqueous isopropanol at 25° C. of 5 to 30 vol. percent, and low solubility for $C_{20+}$ paraffinic hydrocarbons, less than 3% by volume.

Solvents that are advantageous are listed below:

| | B.P., ° C. |
|---|---|
| Acetone | 56.5 |
| Ethyl alcohol | 78.4 |
| Methyl ethyl ketone | 79.6 |
| Tert. butyl alcohol | 82.9 |
| Ethyl acetate | 80 |
| Sec. butyl alcohol | 95 |
| Methyl n-propyl ketone | 97 |

Mixtures of such solvents for addition to aqueous isopropanol may also be used.

Solvents of 95° C. B.P. or above are difficult to completely remove from the oil during the steaming operation, and solvents of below 50° C. B.P. are too volatile to be used due to excessive evaporation losses. Other desired properties such as low solubility of oil and solvency in water are considered important.

For desired results the wash solvent compositions to be used are 5 to 30 vol. percent of the partially water-soluble organic solvent added to an aqueous isopropanol containing 50 vol. percent isopropanol, or in the range of 40 to 60 vol. percent isopropanol.

The wash solvent can be used in about equal parts by volume with respect to the white oil or thereabouts depending on the degree of purification desired. The washing temperatures are generally in the range of 20 to 100° C., preferably 50 to 80° C.

The production of technical and white mineral oils from high boiling petroleum fractions requires large quantities of oleum in successive treats. A complex mixture of sulfonation products are formed, including sulfonic acids, highly colored asphaltic and resinous compounds and other deleterious impurities. Most of these sulfonation products collect in an oil insoluble tarry acid sludge which separates out after treatment, but some colored impurities remain in the acid oil layer along with the high molecular weight sulfonic acids. The complete removal of the color bodies from the oil layer is highly advantageous as these materials further react with the successive oleum treats and also impart color to the finished neutral oil.

A typical white oil treating method is summarized:
(1) A 10 vol. percent oleum treat at 70° C. followed by settling and separation of the acid oil from the sludge formed.
(2) An 8 vol. percent oleum treat as in (1).
(3) Neutralization of the intermediate acid oil with aqueous sodium carbonate and two washes of 100 volume percent of fifty percent aqueous isopropanol at 70° C. to recover the sulfonates.
(4) Steaming of the washed intermediate neutral oil at 125° C. to remove traces of isopropanol and water.
(5) Three successive treats of 5 vol. percent oleum at 40° C. as in (1).
(6) Neutralization and washing of the final acid oil as in (3).
(7) Steaming as in (4).
(8) Percolation of the finished neutral oil through 5 wt./vol. percent of 30/60 mesh roasted attapulgus clay to produce a finished white oil.

The usual expression of this typical method is as follows:

Treat-Treat-Wash-Treat-Treat-Treat-Wash
1    2    3 & 4    5    5    5    6 & 7

A 50% aqueous isopropanol wash is used in steps 3 and 6 to remove the sulfonates from the neutralized acid oil. This solvent does not remove the deleterious color bodies from the oil completely. To overcome this deficiency, about 5 to 30 vol. percent of a selected solvent is added to the isopropanol wash to increase its solvent power in removing all the color bodies from the oil.

Color bodies not removed from the intermediate and final neutral oils after washing are further degraded and darkened by the steaming operating at 125° C. This places an additional burden on the efficiency of the final oleum treating and on the clay percolation of the finished neutral oil.

Advantages of the improved process method:
(1) More efficient utilization of the oleum.
(2) Improved clay filter yields of finished white oil.
(3) Improved quality technical oils can be produced.
(4) Finished white oil of higher quality can be produced.

EXAMPLE 1

Sixteen hundred ml. of acid oil having a Saybolt universal viscosity of 360 seconds at 100° F. from an acid agitation settler overflow, plant production, was separated into two 800 ml. portions. One portion was neutralized with aqueous sodium carbonate and given one wash of 800 ml. of 50% aqueous isopropanol at 70° C. The other portion was neutralized with aqueous sodium carbonate and given one wash of 800 ml. of 50% aqueous isopropanol containing 25 vol. percent of methyl ethyl ketone (M.E.K.). Both samples were settled hot, the alcoholic sulfonate layer drawn off, the oil layer steamed at 125° C. for ½ hour, cooled, then percolated through 5 wt. percent of 30/60 mesh attapulgus clay per column of oil. Methyl ethyl ketone is found to be a most suitable solvent to use in combination with isopropyl alcohol since it has an excellent solubilizing effect on color bodies not removed by the alcohol. These color bodies appear to be most readily extracted by solvents containing Oxo or carbonyl functions.

The neutral and the percolated white oils have the following characteristics:

Inspections

|  | Isopropanol Washed Sample | Isopropanol-MEK Washed Sample | Spec. |
|---|---|---|---|
| Acid Oil | 800 ml. Overflow Pepper sludge content = 0.55%. | 800 ml. Overflow Pepper sludge content = 0.55%. |  |
| Neutralizer Solvent Wash at 70° C. | Aqueous Na$_2$CO$_3$ 800 ml. of 50% Aqueous Isopropanol. | Aqueous Na$_2$CO$_3$ 800 ml. of 50% aqueous Isopropanol containing 25 Vol. Percent M.E.K. |  |
| Neutral Oil Color | −2 Saybolt | +17 Saybolt |  |
| Finished Percolated White Oil (5 wt. percent Clay): |  |  |  |
|    Optical Density | 0.375 | 0.185 | .2 max. |
|    Color, Saybolt | +20 | +30 up | +30 min. |
|    U.S.P. Carbonizable Substance. | 1.53 | 0.87 | 3 max. |

EXAMPLE 2

Acid oil overflow from an acid treater settler containing 0.6% pepper sludge, was used in this study. Volumes of 800 ml. of acid oil, 600 ml. of 50% aqueous isopropanol, and 200 ml. of solvent were mixed together at 25° C. Then 70 ml. of saturated aqueous Na$_2$CO$_3$ was added to neutralize the acid oil, the mixture heated to 55° C. in 15 minutes and settled hot. The alcoholic soap layer was drawn off, the oil layer brightened by settling at 60° C. on a steam bath after which the oil was steamed ½ hour at 125° C. The neutral oil was cooled, paper filtered to remove any moisture, and precolated through 5 wt. percent of 30–60 mesh roasted Attapulgus clay per volume of oil. The finished white oil was inspected for color, optical density, and U.S.P. carbonizable substances. See the following table.

At a concentration of 25 vol. percent of selected solvent in a 100 vol. percent wash per volume of acid oil, none of the solvents examined showed an incompatibility to the 50% aqueous alcohol or to the saturated aqueous sodium carbonate solution used in neutralization. The volume ratio of this improved wash is 2.5 parts solvent to 3.75 parts 100% isopropanol to 3.75 parts of water; which is the right strength for each component to be most effective in the neutralizing and extracting from the acid oil the sulfonate and color bodies.

The attached table presents pertinent data.

In normal production, it requires at least two 100 vol. percent alcohol washes to remove all the sulfonate and color bodies from the neutral oil. The new treating procedure of the present invention achieves the same effect with only one wash. The color and stability inspections on the oils clearly show the added quality of the alcohol-M.E.K. washed product over the conventional alcohol washed oil.

The invention described is claimed as follows:

1. In a process for washing a white oil formed by sulfuric acid treatment following neutralization of the treated oil to remove color-forming organic impurities from said oil, the improvement which comprises washing said oil with about equal parts of a washing solvent formed by combining an aqueous isopropanol containing 40 to 60 vol. percent isopropanol with a low molecular weight aliphatic Oxo organic solvent which boils in the range of 56.5 to 97° C. and dissolves less than 3 vol. percent C$_{20+}$ paraffinic oil, so that said washing solvent contains 5 to 30 vol. percent of said Oxo organic solvent.

2. A process in accordance with claim 1 wherein said Oxo organic solvent is selected from the class of C$_2$ to C$_5$ aliphatic ketones and esters.

3. A process in accordance with claim 1 wherein said Oxo organic solvent is methyl ethyl ketone.

4. A process in accordance with claim 1 wherein said Oxo organic solvent is acetone.

Table 1
DATA AND INSPECTIONS ON USE OF SELECTED SOLVENTS

| Selected Solvent Used | 50% IPOH (Control). | Sec. Butyl Alc. | Acetone | M.E.K. | Ethyl Alcohol |  |
|---|---|---|---|---|---|---|
| Ml. 6B Acid Oil Used | 800 | 800 | 800 | 800 | 800 |  |
| Percent Pepper Sludge, 6B Acid oil | 0.6% | 0.6% | 0.6% | 0.6% | 0.6% |  |
| Ml. 50% IPOH Used | 600 | 600 | 600 | 600 | 600 |  |
| Ml. Selected Solvent Used | 200 Ml. IPOH | 200 Ml. SBOH | 200 Ml. Acetone. | 200 Ml. MEK | 200 Ml. ETOH |  |
| No. of Washes Used | 1 | 1 | 1 | 1 | 1 |  |
| Vol. Percent Selected Solvent Total 800 Ml. Wash. | 0 | 25 | 25 | 25 | 25 |  |
| Ml. of Sat'd. Na$_2$CO$_3$ Used as Neutralizing Agent. | 70 | 70 | 70 | 70 | 70 |  |
| Highest Neutralizing Temp | 55° C | 55° C | 55° C | 55° C | 55° C |  |
|  |  |  |  |  |  | Spec. |
| Neutral Oil Color, Saybolt | −4 | 0 | 0 | 0 | −2 | None. |
| Clay Perc. Oil Color, Saybolt | +26 | +30 up | +30 up | +30 up | +30 up | +30 Min. |
| Optical Density, Clay Perc. Oil | .312 | .194 | .209 | .188 | .207 | 2. Max. |
| USP Carb. Subst., Perc. Oil | 1.31 | 2.30 | 1.86 | 1.53 | 1.31 | 3 Max. |

ETOH = Ethyl Alcohol.
M.E.K. = Methyl ethyl ketone.
SBOH = Secondary butyl alcohol.
IPOH = Isopropanol.

References Cited in the file of this patent

UNITED STATES PATENTS

| 1,760,129 | Fischer | May 27, 1930 |
| 1,791,926 | Gallagher | Feb. 10, 1931 |
| 2,159,444 | McCluer et al. | May 23, 1939 |
| 2,335,006 | Giraitis | Nov. 23, 1943 |
| 2,515,197 | Cohen | July 18, 1950 |
| 2,788,310 | Wilson et al. | Apr. 4, 1957 |